Figure 1:
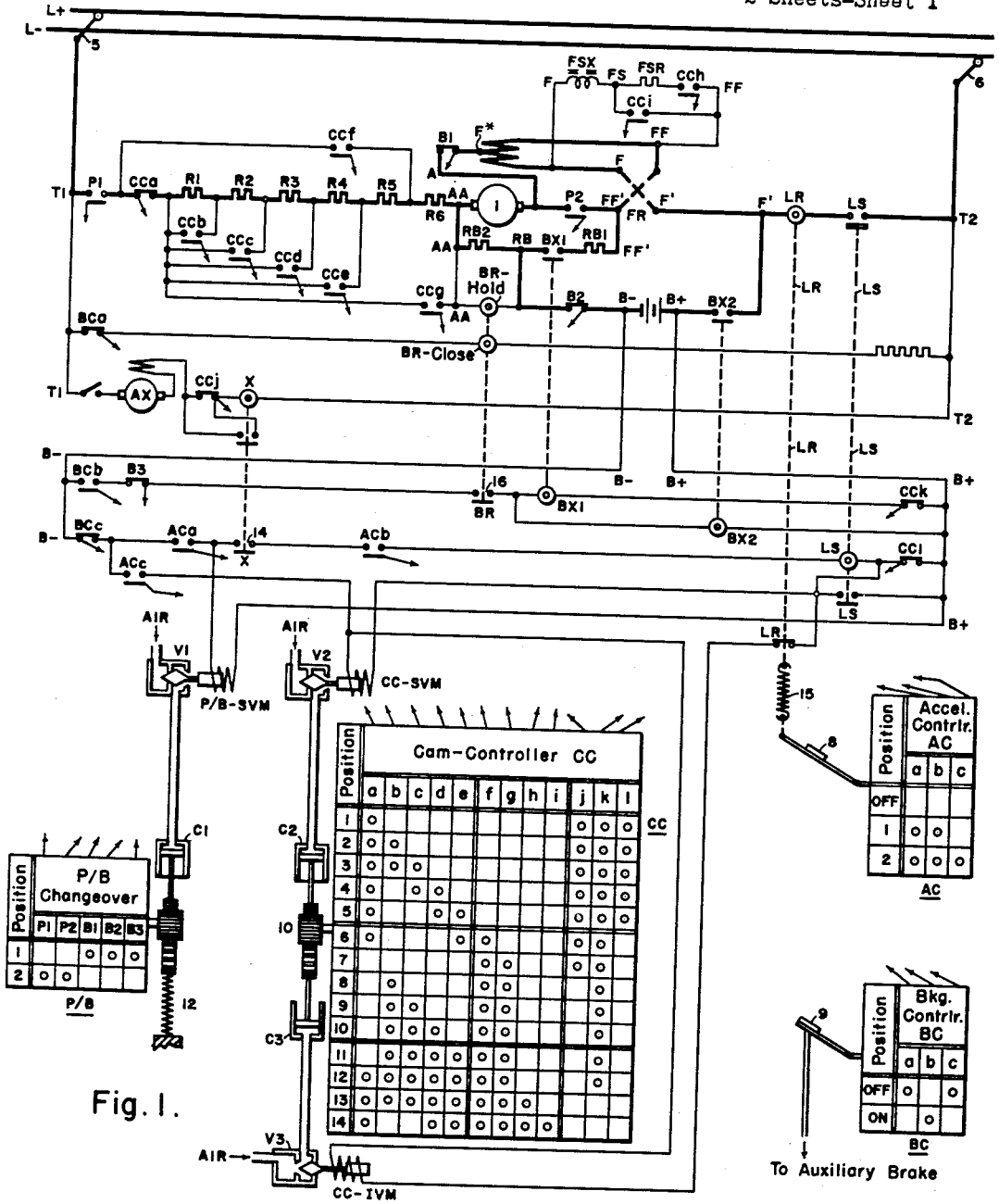

July 31, 1956 N. H. WILLBY ET AL 2,757,328
SERIES-MOTOR DYNAMIC-BRAKING CONTROL
Filed April 7, 1954 2 Sheets-Sheet 1

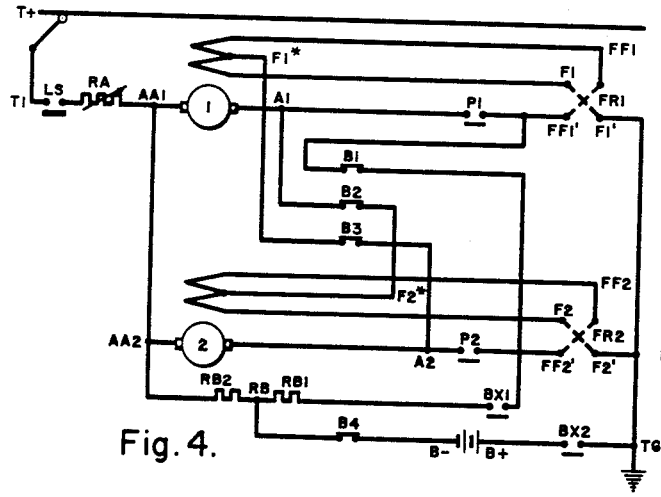
Fig. 4.
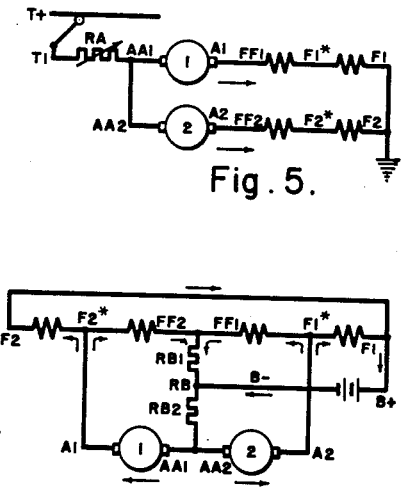
Fig. 5.
Fig. 6.
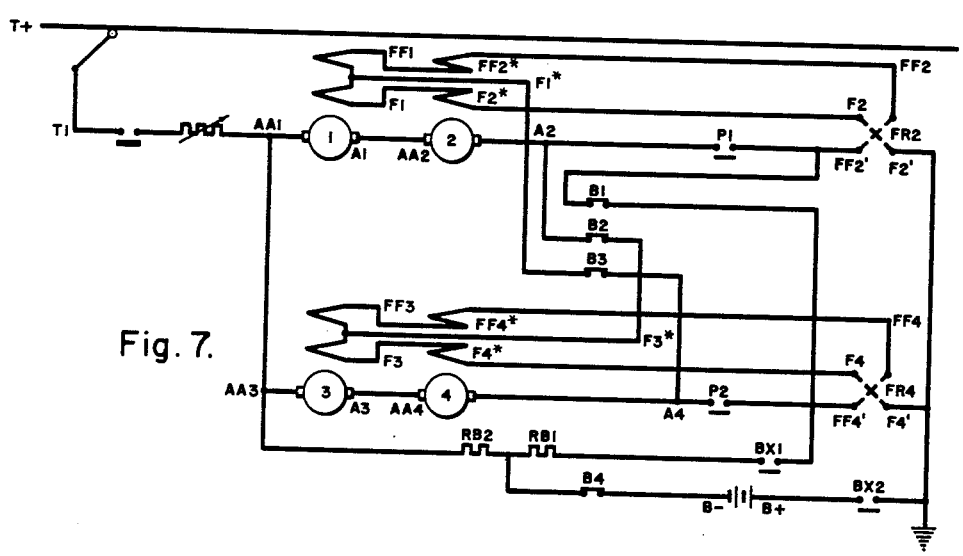
Fig. 7.
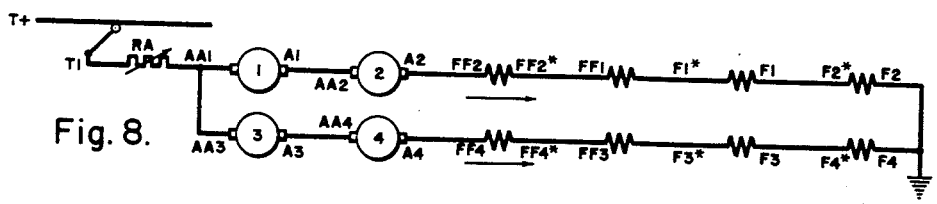
Fig. 8.
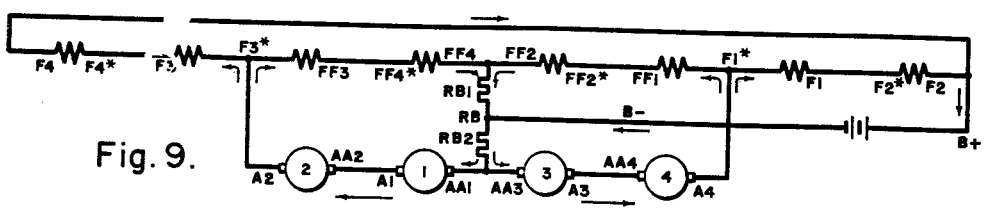
Fig. 9.

United States Patent Office 2,757,328
Patented July 31, 1956

2,757,328
SERIES-MOTOR DYNAMIC-BRAKING CONTROL

Norman H. Willby, Irwin, and Robert R. Lewis, Pittsburgh, Pa., assignors to Westinghouse Electric Corporation, East Pittsburgh, Pa., a corporation of Pennsylvania Application April 7, 1954, Serial No. 421,546

6 Claims. (Cl. 318—274)

Our invention relates to self-energizing and self-regulating dynamic-braking schemes for direct-current traction-motors, which may, or may not, be single-step schemes. The expression single-step or one-step indicates that there is only a single step or magnitude of braking-resistance. Self-energizing and self-regulating schemes are attractive, in that they cannot be abused by the operating personnel. Furthermore, it is frequently not necessary, in such schemes, to wait to adjust the magnitude of the braking-resistance to the speed of the vehicle when dynamic braking is desired, and the braking characteristics are self-regulated by the action of the armature current. Like any other dynamic-braking scheme, our scheme reduces brake-drum wear and (what is more important in subway-service) it reduces the metal dust which is produced by the application of brakes.

Two kinds of single-step dynamic-braking schemes are in use today, on trolley coaches and other motor-propelled vehicles. One such scheme uses a shunt or compound motor, taking its field-excitation for dynamic braking from the trolley, and modifying that excitation with the armature current. The other scheme uses a series motor which is connected, during dynamic braking, from the battery which is carried by the vehicle, the amount of this current being modified by the armature current. The shunt or compound-motor scheme loses its brake with loss of trolley voltage, it requires an expensive shunt or compound motor, and it uses additional power from the line in order to obtain dynamic brake. The series-motor battery-scheme requires such large currents from the battery that only a limited and inadequate amount of dynamic brake is available, with standard batteries and charging-sets.

The present invention uses the cheaper series motor, and depends mainly upon self-generated or armature-generated excitation-energy for dynamic-braking, using a two-part series main-field winding, one part of which is reconnected so that it is supplied, during dynamic braking, by battery-current which is in the battery-charging direction at high braking-speeds, and in the discharging direction during low braking-speeds. The battery furnishes only such small amounts of energy as are necessary for proper control, resulting in bucking or boosting the main armature-current excitation, according as a predetermined divided part of the armature-voltage is larger or smaller than the battery-voltage. Since the battery both charges and discharges during the braking-cycle, there is no net discharge from the battery, and hence no limitation as to the available amount of dynamic-braking energy and no reason to use other than standard charging-sets and standard batteries. There is also a saving in power, since there is no energy taken from the line, and no net discharge from the battery, during dynamic braking.

Figure 2:
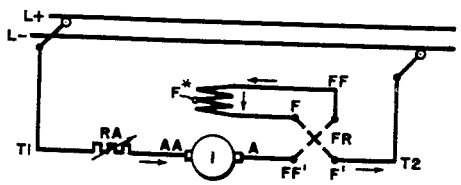
Figure 3:
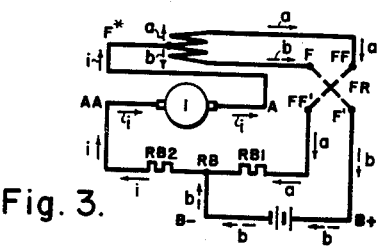

Our invention is susceptible of embodiment in a number of different forms, which are applicable to single-motor trolley-coaches, multiple-motor railway-vehicles, and in fact any vehicle which is propelled by one or more series direct-current motors, and which is provided with a battery or other source of approximately constant-voltage direct-current power for supplying loads other than the traction-motors of the vehicle. Several illustrative forms of embodiment are shown in the accompanying drawing, wherein:

Figure 1 is a diagrammatic view of circuits and apparatus embodying our invention in an illustrative form of embodiment which is applicable to single-motor trolley-coaches, Figs. 2 and 3 are simplified schematic diagrams showing the motoring connections and the braking connections, respectively, of the control-system which is shown in Fig. 1, Fig. 4 is a simplified main schematic diagram for a two-motor equipment, with the necessary switching for both accelerating and braking operations, Figs. 5 and 6 are the corresponding simplified schematic connections for the motoring and braking operations, respectively, of the control-system which is shown in Fig. 4, and Figs. 7, 8 and 9 are diagrams similar to Figs. 4, 5 and 6, respectively, except that they are for a four-motor installation, rather than a two-motor installation.

The equipment shown in Fig. 1 represents the essential electrical parts of a trolley-coach, which is energized from positive and negative trolley-wires L+ and L— through two trolley-poles 5 and 6, or other current-collecting devices. The two trolley-poles 5 and 6 energize a pair of supply-line terminals T1 and T2, respectively. The trolley-coach is provided with a direct-current series-motor traction-means, which, in Fig. 1, consists of a single motor which includes an armature 1 having a first terminal AA and a second terminal A, and a two-part or tapped main-field winding having a first terminal FF, a second terminal F, and an intermediate tap or connection-point F*. The motor is provided with the usual field-reverser FR, having the terminals FF' and F', corresponding to the field-terminals FF and F, respectively.

The acceleration of the main motor 1 of Fig. 1 is accomplished in a manner which is similar to that which is described in the Willby Patent 2,663,835, granted December 22, 1953, or in any other suitable way. In the illustrated control-scheme in Fig. 1, the acceleration or power-operation of the main motor 1 is accomplished by operating the motor as a straight or ordinary series motor, which is brought up to speed by cutting out series resistance R1 to R6, in a conventional manner. When all of the accelerating resistance R1 to R6 has been cut out, the motor-speed is usually still further increased by one or more field-reducing steps, which are illustrated in the form of field-shunting steps wherein the field-terminals FF and F are shunted by a field-shunt consisting of an inductance FSX and a resistance FSR having a common connection-point FS between them.

The power-operation circuit, in Figs. 1 and 2, may be traced from the positive supply-line terminal T1, to the first armature-terminal AA, thence through the armature 1 to the second armature terminal A, through a control-contact P2 to the reverser-pole FF'—FF, through both parts of the field-winding FF—F, and thence through the reverser-pole F—F' and through a limit-relay coil LR and a line-switch make-contact LS to the negative supply-line terminal T2.

Dynamic braking is accomplished, according to our present invention, by disconnecting the main motor from the line, changing the connection of the second armature-terminal A from the first field-terminal FF to the control-contact B1 and thence to the intermediate tap-point F*, connecting the first reverser-terminal FF' to the first armature-terminal AA through a two-part braking-resistance consisting of the parts RB1 and RB2 which are joined by a common connection-point RB, and connecting the second reverser-terminal F' to the intermediate control-braking-resistor connection-point RB, through control-contacts BX2 and B2 and a storage-battery or other vehicle-carried source of auxiliary power, having the positive and negative terminals B+ and B—, respectively. The battery or equivalent auxiliary source of approximately constant-voltage direct-current power is used for supplying various loads, on the vehicle, other than the power-operation of the traction-motor 1.

The control-equipment for controlling the operation of the main traction-motor 1 includes four controllers which are shown at the bottom of Fig. 1. Reading backwardly from right to left, these controllers include, first, an accelerating controller AC which is operated by a pedal 8; second, a braking controller BC which is operated by a pedal 9; third, a cam-controller CC which is operated by an air-engine consisting of two opposed cylinders C2 and C3, operating through a rack-and-pinion mechanism 10, and finally a two-position power-brake changeover-switch P/B which is illustrated as being actuated by an air-engine having a single cylinder C1 which moves the changeover-switch against the bias of a compression-spring 12 which is adapted to return the switch to its normal unactuated position.

Each of these four controllers AC, BC, CC and P/B is provided with a plurality of operating-positions and a plurality of contacts, the contact-sequence being diagrammatically indicated, in each case, in the form of a sequence-chart wherein a closed position of any particular contact is indicated by a circle, in accordance with the usual convention. The accelerating controller AC has three contacts CCa, CCb and CCc; the braking controller BC has three contacts BCa, BCb and BCc; the cam-controller CC has twelve contacts CCa to CCl; and the power-brake changeover-switch P/B has five contacts P1, P2, B1, B2 and B3. For convenience in finding the various contacts of the several controllers, and as a convention for diagrammatically indicating the mechanical connection or association between the various contacts and the various controllers, we have used arrows, which have been chosen in lieu of dotted-line connections, as a convention for indicating the association without confusing the diagram with large numbers of dotted lines running between the various parts.

Our illustrated control-equipment, in Fig. 1, also includes six electrically operated relays or contactors X, BR, BX1, BX2, LR, and LS. All of these electrically controlled relays or switches are diagrammatically indicated as having vertical switch-stems (indicated by dotted lines) which are biased by gravity toward their lowermost positions, and all of these switches and relays are shown, in Fig. 1, in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

The details of the control-equipment, for operating the various contacts, are not essentially new, or peculiar to our present invention, except for the addition of the two auxiliary braking contactors BX1 and BX2. It may be noted, in passing, that the auxiliary motor AX is representative of any one of a number of auxiliaries which are more or less important to the successful operation of the main motor 1, such as driving a blower (not shown), or driving an auxiliary generator (not shown), or for other auxiliary uses on the trolley-coach. Thus, the auxiliary-motor relay X, having an operating coil X which is connected in series with the auxiliary motor AX through the control-contact CCj, may be taken as representative of a relay having a main make-contact 14 which is closed whenever the auxiliary equipment is ready for the commencement of an operation of the main motor 1.

As in the Willby patent, it will be noted that the accelerator pedal 8 is connected to the stem of the limit relay LR through a tension-spring 15, so that a depression of the accelerating pedal 8 will increase the pull of gravity on this limit relay, and thus increase the current-setting of the relay, so as to cause the motor to accelerate more rapidly, according to the amount by which the operator decreases his accelerator pedal 8.

It may be noted, also, that the P/B air-engine cylinder C1 is energized with compressed air, under the control of a standard valve V1, which is opened by a magnet-coil P/B—SVM. In like manner, the cylinder C2 of the CC air-engine is energized through a standard valve V2 which is opened through the energization of a magnet-coil CC—SVM, while the cylinder C3 of the CC air-engine is energized through an inverted valve V3 which is closed by the energization of a magnet-coil CC—IVM.

The changeover-switch magnet-coil P/B—SVM, the two cam-controller magnet-coils CC—SVM and CC—IVM, and the line-switch operating-coil LS, are energized from the battery-terminals B+ and B— in essentially the same way as in the Willby patent, except that we have chosen to energize our last cam-controller contact CCl through the first five cam-controller positions, instead of the first two cam-controller positions as shown by Willby. The changeover-switch magnet-coil P/B—SVM is energized when the braking controller BC is "off" and the accelerating controller AC is "on," in a circuit extending from the negative battery-terminal B— through the control-contacts BCc and ACa to said coil P/B—SVM, and thence to the positive battery-terminal B+.

Our circuit for the standard-valve magnet-coil CC—SVM includes the control-contacts BCc and ACc, the coil CC—SVM, and the auxiliary line-switch make-contact LS, the latter being paralleled by the last cam-controller contact CCl. Our circuit for the inverted-valve magnet-coil CC—IVM includes the control-contacts BCc and ACc, the coil CC—IVM, the limit-relay back-contact LR, and the parallel-connected contacts CCl and LS. Our circuit for the line-switch operating-coil LS includes the contacts BCc, ACa, 14, and ACb, the coil LS, and the parallel-connected contacts CCl and LS.

The braking relay BR has two coils, namely a BR-Close coil for actuating the relay in the first place, before a braking-operation is called for by the braking controller BC, and a BR-Hold coil, which is energized in parallel with the braking resistance RB2, for holding the relay closed, during a braking-operation, until the braking current drops down to an insignificant amount, at vehicle speeds below two or three miles per hour, after which this braking relay becomes deenergized, thus relieving the battery of unnecessary burden, even though the vehicle-operator keeps his foot on the brake-pedal 9 in order to bring and hold the vehicle to a full stop.

This braking relay BR has a main make-contact 16, which is used to control the energization of the two auxiliary braking relays BX1 and BX2. This contact 16 is in series with a braking-controller contact BCb, which is closed when the braking controller is in its "on" position, and a braking-circuit auxiliary contact B3, which is closed when the P/B changeover-switch is in its No. 1 or deenergized position. In addition, we have provided the energizing circuit of the auxiliary braking contactor BX1 with an interlocking cam-controller contact CCk, which is closed in all positions of the cam-controller except the last two positions which correspond to reduced-field operation of the motor 1. The contact of this contactor BX1 is in series in the main braking circuit containing the braking resistance RB1, and hence a braking operation cannot be established until the cam-controller CC has returned from its short-field No. 14 position, at least as far as its No. 12 position in which full-field conditions are restored to the motor 1.

Otherwise, it is believed that the motor-accelerating operation of the control-equipment of Fig. 1 will be obvious, particularly with the explanations contained in the aforesaid Willby patent.

In resumé of the operation of the novel features of our invention, as shown in Figs. 1, 2 and 3, it is to be noted that the dynamic-braking connections are as shown in Fig. 1, except that, for braking, the braking controller BC has to be moved to its "on" position, which closes the contact BCb, which energizes the operating coils of the auxiliary braking contactors BX1 and BX2, provided that the vehicle is then operating at a speed high enough to suitably energize the hold-coil of the braking relay BR. These braking connections are shown in Fig. 3.

When the braking-connections of Fig. 3 are first made, the battery immediately energizes the motor-field, giving the motor a fast build-up from residual-field values to a substantial field-condition. The polarity of the battery can be in either direction, either to build up a motor-field in the same direction as the residual field, which is the same direction in which the field had been energized during motoring, or the battery can energize the motor-field in the reverse direction, so that the armature-current during braking will be flowing in the same direction as it had been flowing during motoring. We have shown the connections with the battery-polarity such as to reverse the motor-field.

After a few microseconds of battery-energized field, the armature-voltage builds up enough to reduce the first inrush of battery-current, and within some hundredths of a second, possibly a tenth of a second, the armature-voltage builds up enough to produce a sensible dynamic-braking effect. Fig. 3 depicts the conditions which are prevalent when the motor is operating at a high speed during the braking-operation. The armature-current $i$ divides into two parts $a$ and $b$ at the field-winding mid-tap F*, and by far the largest portion $a$ flows through the top field-part F*—FF in the same direction as the initial momentary battery-current, thus supplying the main motor-field during dynamic braking, while a small part $b$ of the armature-current reverses the initial battery excitation in the lower field-part F*—F, and flows through the battery in a battery-charging direction. This action continues until the vehicle-speed is reduced to a point at which the portion of the armature-voltage, which appears across the braking-resistance RB1, is equal to the battery-voltage, at which time the battery-current $b$ becomes zero. As the vehicle-speed further reduces, the battery-current $b$ reverses and flows in a cumulative direction through both portions of the field-winding, in the direction from F to FF, thus assisting the armature-energized field-excitation in the top field-portion F*—FF, with all of the armature current $i$ now flowing through this top field-portion F*—FF.

Thus, the battery-current is used for the automatic or self-regulation of the motor-field during braking, bucking or reducing this field (and charging the battery) during high-speed braking, and increasing the field (and discharging the battery) at low braking-speeds. It will be obvious that the braking characteristics are self-regulating, being dependent substantially solely upon the proportion and direction of the battery-current relative to the armature-current during the braking-operation, the value of the braking-resistances RB1 and RB2, and the relative number of turns in the two parts of the field-winding. These values are predetermined by the resistance-values of the two parts of the braking-resistance RB1 and RB2, and by the choice of the battery-voltage.

In the embodiment of our invention which is illustrated in Fig. 1, we have used fixed values of the braking-resistances RB1 and RB2, so that there is nothing to be adjusted, and so that it is impossible for the vehicle-operator to abuse the motor 1 during braking. This single-value or one-step feature, coupled with the self-regulating action which is produced by the automatic changes in the magnitude and direction of the battery-current at different braking-speeds, makes it possible to obtain the proper initial intensity of dynamic braking immediately upon the establishment of the braking-circuits, without requiring any waiting for an adjustment of the magnitude of the braking-resistance to correspond to the speed of the vehicle. In our system as illustrated in Fig. 1, the braking resistance is never changed, and the adjustment of the braking-conditions to the speed of the vehicle is automatically obtained by the relation of the vehicle-speed to the armature-voltage, which in turn controls the bucking or boosting effect of the current which passes through the battery in either the charging or discharging direction, according to the speed.

While we have illustrated a simple control which is adequate without any changing of the braking-resistance during the braking-operation, we realize that our invention is applicable also to systems in which it may be desirable to permit the vehicle-operator to have some control over the braking-intensity by manually or automatically preselecting the amount of braking-resistance which is to be used during any complete brake-operation, or during different portions or speed-ranges of the braking-operation, still retaining the advantage of the above-explained self-regulating action, and still retaining the advantage of both charging and discharging the battery during different portions of the braking-cycle, as the vehicle is being brought to a stop.

Furthermore, while we have illustrated the use of separate braking-resistances RB1 and RB2, which are in addition to the accelerating-resistances R1 to R6, we could, at the expense of only a slight amount of additional switching, have used the accelerating-resistances R6, R5, R4, and R3, etc., or any portion thereof, as the braking-resistance which is to be connected across the points AA and FF' during the braking-operation. We desire it to be understood that these and other modifications could be made in the precise form of execution of our invention, without departing from the essential spirit thereof.

It may be noted that our main dynamic-braking circuit in Fig. 3 serially includes both parts of the braking-resistances RB1 and RB2, the armature 1, and only one part, F*—FF, of the two-part main-field winding F—FF. We provide a connection from the battery or auxiliary source, for simultaneously establishing a circuit which extends from one battery-terminal, such as B+, through both field-parts F—F* and F*—FF, and through only one part of the braking-resistance RB1, and back to the other battery-terminal B—, noting that the two field-winding parts are cumulative with respect to each other, in this complete battery-circuit. This last statement treats the operation as if all of the armature-current $i$ were flowing through only the top portion of the field-winding and through both parts of the braking-resistances RB1 and RB2, while all of the battery-current is treated as flowing through the two parts of the field-winding and the one part of the braking-resistance RB1, in the battery-circuit just outlined.

It is to be noted that the position of the field-reverser FR corresponds to the direction of rotation of the armature 1, so that the field-excitation is reversed when the rotation of the armature is reversed. It is necessary, therefore, for the braking-circuit connections to be made to the field-reverser terminals FF' and F', rather than to the field-terminals FF and F, so that, whichever may be the direction of armature-rotation, the field-direction will be proper for that rotation, during both motoring and braking, being fixed by the position of the field-reverser FR, whichever position this may be. On the other hand, it is usually desirable for the field-shunting connections FSX—FS—FSR to be placed directly across the field-winding terminals F and FF, so as to avoid possible difficulties in the event that the field-reverser FR may have been left in its neutral or open position when an attempt is made to operate the vehicle.

It is also to be understood that, in place of using a field-shunt FSX—FS—FSR, we could have used the field-tap F* to obtain a weakened-field motor-operation, particularly if the field-tap F* were at substantially the midpoint of the field-winding F—FF, since a 50% reduced field is all that is commonly desirable during high-speed motor-operation. We have preferred to illustrate our invention in a more general way, however, using a field-shunt rather than field-tapping to obtain a reduced-field operation during high-speed motoring, so that we will not be limited to a 50-50 division of the motor-field by the intermediate connection-point F* which is used during our novel dynamic-braking connections, thus leaving the designer free to choose such field-turn ratios, of the field-portions FF—F* and F*—F, as will give the desired shape and intensity of braking-characteristic, when plotted against various braking-speeds.

While we have thus far more particularly described our invention in connection with a simple single-motored trolley-coach application, our invention is likewise applicable to plural-motored vehicles.

Thus, Figs. 4, 5 and 6 show the application of our invention to a vehicle which is provided with two traction-motors 1 and 2, the terminals of which are distinguished from each other by the numeral suffixes 1 and 2, respectively. In Figs. 4 and 5, as in Fig. 2, the accelerating-resistances R1 to R6 of Fig. 1 are lumped together diagrammatically, as a single variable accelerating-resistance RA. In Fig. 4, the braking-circuit contacts B1 to B4 are energized in the No. 1 position of the changeover switch P/B, while the power-circuit contacts P1 and P2 are energized in the No. 2 P/B position. Otherwise, the control-circuits of Fig. 4 may be essentially the same as in Fig. 1.

It may be noted, briefly, that our Fig. 4 connections show the two motors 1 and 2 as being connected in a parallel-motor connection, during both motoring and braking operations, with the two positive (during motoring) armature-terminals AA1 and AA2 permanently connected together, and with the two negative field-reverser terminals F1' and F2' permanently connected together. When braking-conditions are established, the two positive field-reverser terminals FF1' and FF2' are connected together by the braking-circuit contact B1, while the intermediate field-taps F1* and F2* are respectively connected to the armature-terminals A2 and A1, respectively, by the braking-circuit contacts B3 and B2, thus making the armature-current of the No. 1 motor energize the field of the No. 2 motor during braking, while the armature-current of the No. 2 motor energizes the field of the No. 1 motor during the same conditions, still retaining the self-regulating battery-current buck-and-boost field-excitation, depending upon the braking-speed, as explained in connection with Fig. 1.

In Fig. 4, we have retained the conventional power-circuit connections in which each of the motor-fields is in series with its own armature, although we are not limited to this detail.

It is believed that the operation of the two-motor vehicle, as shown in Figs. 4 to 6, will be obvious from the diagram in the light of the explanations which have already been made.

A similar treatment can be given to a four-motor installation, or even a larger number of motors, as shown in Figs. 7 to 9. The necessary braking-circuit connections are obtained by dividing the total number of motors into two motor-circuits. Thus, in Figs. 7 to 9, the two motor-armatures 1 and 2 are connected in series with each other, and are treated in the same manner as the single motor-armature 1 in Fig. 4; whereas the two field-portions FF2—FF2* and F1—F1* are connected in series with each other and treated in the same manner as the single field-portion FF1—F1* in Fig. 4, and so on, as will be obvious from the connections which are shown in Figs. 7, 8 and 9.

While we have illustrated our invention in only three illustrative forms of embodiment, we wish it to be understood that we are not at all limited to these precise forms of embodiment, as the broader aspects of our invention embrace the range of equivalents which has been indicated in the foregoing description. We desire, accordingly, that the appended claims shall be given the broadest construction consistent with their language.

We claim as our invention:

1. A motor-controlling assembly, including: (a) a direct-current series-motor means, having a motor-armature means and a two-part main-field winding-means, (b) a motor-acceleration connection-means for at times establishing and controlling a power-operation of the assembly, with the two parts of a main-field winding-means connected cumulatively in series with a motor-armature means, (c) an auxiliary source of approximately constant-voltage direct-current power for supplying loads other than said power-operation of the assembly, (d) a two-part braking-resistance having an intermediate connection-point, and (e) a dynamic-braking connection-means, including a self-excited connection for at times establishing a main dynamic-braking circuit serially including both parts of said braking-resistance, a motor-armature means, and only one part of a two-part main-field winding-means, in the order named, and an auxiliary-source connection for simultaneously establishing an auxiliary-source circuit serially including both parts of said two-part main-field winding-means, the part of said braking-resistance which is connected to the main-field winding-field in the main dynamic-braking circuit, and said auxiliary source, the two field winding parts being cumulative with respect to each other in the circuit including said auxiliary source.

2. The invention as defined in claim 1, characterized by the braking-resistance having a substantially fixed value throughout a predetermined range of braking-operation, the braking characteristics of the assembly being dependent substantially solely upon the proportion and direction of the source-current relative to the armature-current during the braking-operation, the value of the braking-resistance, and the relative numbers of turns in the two parts of the main-field winding-means.

3. The invention as defined in claim 1, characterized by said assembly comprising two direct-current series-motor means, each having its own motor-armature means and its own two-part main-field winding-means, there being two dynamic-braking circuit-portions in each of which the motor-armature means of one series-motor means is connected to the main-field winding-means of the other series-motor means.

4. A motor-controlling assembly, including: (a) a direct-current series-motor means, having a motor-armature means and a two-part main-field winding-means, (b) a motor-acceleration connection-means for at times establishing and controlling a power-operation of the assembly, with the two parts of a main-field winding-means connected cumulatively in series with a motor-armature means, (c) an auxiliary source of approximately constant-voltage direct-current power for supplying loads other than said power operation of the assembly, (d) a two-part braking-resistance having an intermediate connection-point, and (e) a dynamic-braking connection-means for at times establishing a split dynamic-braking circuit, wherein the major part of the current in a motor-armature means flows serially through one part of a field-winding means and through all of the braking-resistance, to determine the field-polarity of the motor-means, and a smaller part of said current flows serially through the auxiliary source, a first part of the braking-resistance, and the other part of the field-winding means, said smaller current being in a source-charging and field-bucking direction at high braking-speeds when the portion of the armature-voltage which appears across the second part of the braking-resistance exceeds the source-voltage, and said smaller current being in a source-discharging and field-boosting direction at low braking-speeds when said portion of the armature-voltage is less than the source-voltage.

5. A motor-controlling assembly, including: (a) a direct-current series-motor means, including a motor-armature means having a first terminal and a second terminal, and a two-part main-field winding-means having a first terminal, a second terminal, and an intermediate connection-point between the two cumulatively connected parts of the main-field winding-means, (b) a motor-acceleration connection-means for at times establishing and controlling a power-operation of the assembly, using a serially connected motor-armature means and both parts of a main-field winding-means, with the second terminal of the motor-armature means connected to the first terminal of the main-field winding means, (c) an auxiliary source of approximately constant-voltage direct-current power for supplying loads other than said power-operation of the assembly, (d) a two-part braking-resistance having a first terminal, a second terminal, and an intermediate connection-point between the two parts of said braking-resistance, and (e) a dynamic-braking connection-means, for at times establishing a plurality of connections, including a changed connection from the second terminal of a motor-armature means to an intermediate connection-point of a main-field winding-means, a connection from the first terminal of the main-field winding-means to the first terminal of the braking-resistance, an auxiliary-source circuit-connection for connecting the auxiliary source between the second terminal of the main-field winding-means and the intermediate connection-point of the braking-resistance, and a connection from the second terminal of the braking-resistance to the first terminal of the motor-armature means.

6. The invention as defined in claim 5, characterized by said assembly comprising two direct-current series-motor means, each having its own motor-armature means and its own two-part main-field winding-means, there being two dynamic-braking circuit-portions in each of which the motor-armature means of one series-motor means is connected to the main-field winding-means of the other series-motor means.

References Cited in the file of this patent
UNITED STATES PATENTS
2,663,835   Willby ---------------- Dec. 22, 1953